March 26, 1968 A. J. GRINER 3,374,875
ARTICLE CONVEYING, SEPARATING AND STACKING APPARATUS
Original Filed Dec. 31, 1963

INVENTOR.
ARTHUR J. GRINER
BY Bauer & Seymour
ATTORNEYS

United States Patent Office 3,374,875
Patented Mar. 26, 1968

3,374,875
ARTICLE CONVEYING, SEPARATING AND
STACKING APPARATUS
Arthur J. Griner, Wyckoff, N.J., assignor to National
Biscuit Company, New York, N.Y., a corporation of
New Jersey
Original application Dec. 31, 1963, Ser. No. 334,796.
Divided and this application Dec. 21, 1966, Ser.
No. 603,485
8 Claims. (Cl. 198—35)

ABSTRACT OF THE DISCLOSURE

Apparatus for handling relatively flat articles comprising conveyor means for continuously feeding a column of articles onto a stationary inclined platform down which the articles slide for on-edge stacking on a slower delivery conveyor positioned a short distance below the lower end of the platform, and rotating cam members projecting through slots in the platform to lift the articles for permitting shingling thereof as the advance of the thus lifted articles is retarded by the delivery conveyor.

---

This application is a division of my pending parent application Ser. No. 334,796, filed Dec. 31, 1963, for "Method and Apparatus for Handling Tablet-Like Articles Such as Biscuits."

The present invention relates to the automatic handling of relatively flat articles, such as biscuit in the form of crackers, cookies and the like, and more particularly to apparatus for continuously conveying such articles from a bakers' band oven while breaking, stacking and conditioning the same for automatic packaging.

A main purpose of the invention is to provide means for automatically advancing and handling baked goods and comparable products between a continuously producing bake oven or other production apparatus and packaging machinery, leaving only occasional adjustments to be made by attendants in charge of the equipment.

The apparatus of the present invention comprises means in novel combination for continuously conveying, breaking and shingling or stacking articles edgewise.

By way of example, the invention is particularly suited to and is illustrated and described herein in connection with the handling of crackers or biscuit baked in a continuous line oven wherein the biscuit are baked and emerge on a continuous moving belt conveyor in the form of large sheets which are longitudinally and transversely scored to divide the same into biscuit-size areas. The scored sheets issuing from the oven are first broken along the transverse scores to form transverse strips of unseparated biscuit which are shingled or stacked on edge by novel means in a novel manner and conveyed through a conditioning zone wherein the baked strips may be kept warm to prevent too rapid cooling or, if desired, may be cooled by forced air circulation, depending upon the nature and requirements of the product.

It is, then, an object of the present invention to provide novel means for shingling or stacking relatively flat articles while the same are being continuously conveyed.

The above and further objects and novel features of the invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a diagrammatic plan view of the general organization of conveying, breaking and stacking equipment for carrying out the present invention;

Figure 1:
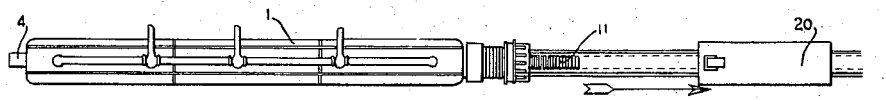
Figure 2:
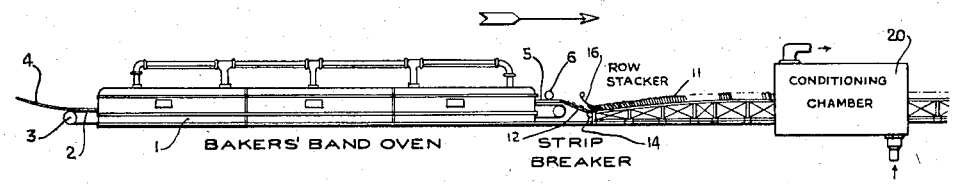
FIG. 2 is a view in elevation of the equipment shown in FIG. 1.

Referring to the drawings which exemplify one form of apparatus embodying the invention, it will be seen that in FIG. 1, which is a diagrammatic top plan view, there is shown a band oven 1 which according to standard practice in the baking industry consists of a long baking chamber of successive tunnel sections rising from a suitable base support. An endless baking band 2 is trained over a driving drum 3 at the entrance end of the oven. The upper run of band 2 extends through the heated section of the oven chamber, whereas the lower run returns beneath the heated section.

Figure 3:
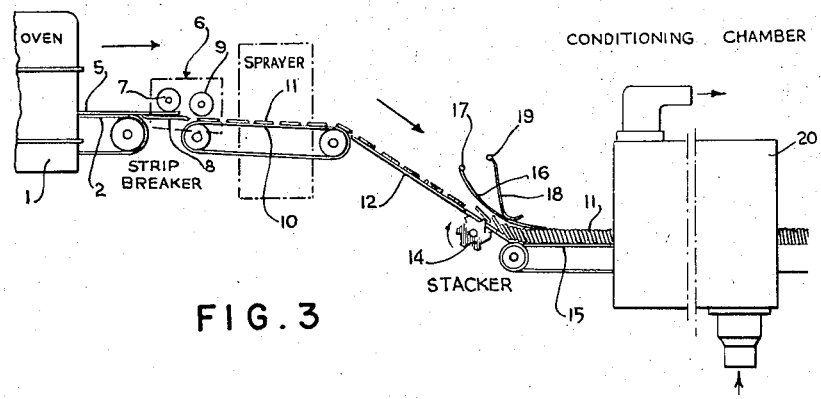
FIGS. 3 and 4 are diagrammatic side elevation and plan views, respectively, showing the equipment of FIG. 1 in more detail and on a larger scale.
Figure 4:
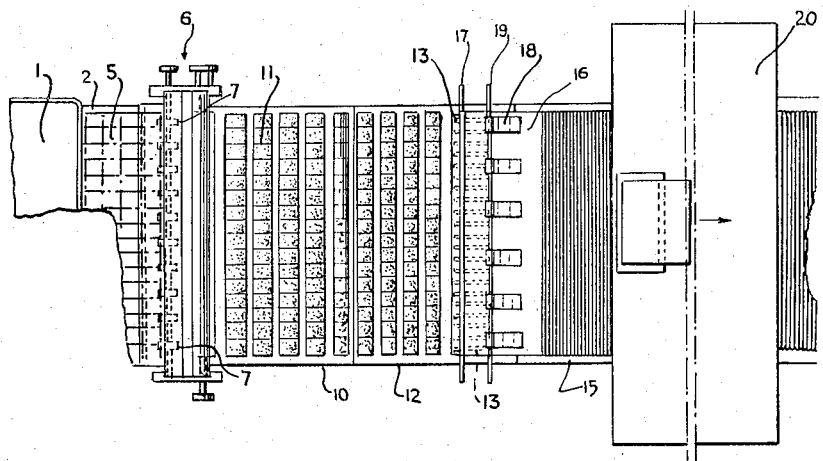

An endless dough sheet 4 of a width sufficient to cover the band 2, save for small margins at the side edges, is fed continuously into the entrance end of the oven. The dough sheet, having its top surface die stamped or scored transversely and longitudinally prior to baking in order to define thereon individual crackers of rectangular shape, will upon completion of baking be discharged from the exit end of the oven in the form of a baked sheet 5. The baked sheet is then transported by the conveyor belt through a strip breaker 6 which comprises revolving rollers or brushes 7 (FIG. 3) exerting pressure upon the baked sheet as it is transported over a portion of the conveyor system that varies sharply from the normal plane of travel. This may be effected by a deflector plate 8 positioned beneath the revolving rollers or brushes 7. After passing under the latter, the leading edge of the baked sheet engages the lower portion of a roller 9 mounted generally above a short drop-off from plate 8 to a belt conveyor 10 to direct the leading edge of the sheet downwardly. At this point, the transverse rows of biscuit forming the baked sheet are caused by tension from the change of their normal path of travel to bend and snap off along their transverse frangible score lines to form strips 11 consisting usually of about sixteen crackers connected to each other at their side edges.

The strips 11 lying flat and preferably in slightly spaced relation may be conveyed through a sprayer and thence to novel mechanism for tilting and shingling the strips with the upper surfaces remaining uppermost, and the lead edges engaging the conveyor. From belt 10, the separated strips 11 are delivered to a plate or slide 12 which preferably but not necessarily slopes sufficiently downward to cause the strips to slide down the same at a speed comparable to the speed at which they are delivered by belt 10.

Near its bottom edge slide 12 has a plurality of transversely spaced longitudinal slots 13. A plurality of cam discs 14 are mounted for rotation with a driven transverse shaft and extend a short distance upwardly through slots 13. The cam discs rotate clockwise as viewed in FIG. 3 at a speed in excess of the speed at which the cracker strips advance down slide 12 so that each strip is engaged by a plurality of the cam discs and kicked upwardly to permit the following strip to move beneath it and thus into underlapping or shingled relation therewith. After passing the cam discs 14 the strips 11 are delivered to a belt conveyor 15 which moves more slowly than conveyor 10. The forward advance of the cracker strips is thus slowed down, and the strips become compacted and somewhat more erect on an edge. An apron 16, which is preferably somewhat flexible, is pivotally supported on a rod 17, extends downwardly and forwardly above cam wheels 14 and rests on the upper edges of the shingled strips on conveyor 15. The central portion of apron 16 above cam discs 14 functions to limit the upward movement of the crackers when the same are lifted in response to engagement thereof by the cam discs. A plurality of flat springs 18 or the like may be pivoted at 19 and suspended to engage apron 16 and hold the same in position.

Conveyor 15, which is preferably a porous metal belt, may, if desired, convey the stacked or shingled strips 11 through a conditioning chamber 20 through which either heated or cooled air or other gas may be circulated by suitable means, such as blowers or exhaust fans. The air may be circulated in either direction through the chamber and hence, may pass either upwardly or downwardly through the belt 15 and between the crackers or other articles thereon.

Although only a single embodiment of the article handling apparatus comprehended by the invention has been illustrated in the drawings and described in the foregoing specification, it is to be expressly understood that the invention is not thus limited. Various changes and modifications which do not depart from the spirit and scope of the invention will now be apparent to those skilled in the art.

What is claimed is:

1. Apparatus for handling relatively flat articles comprising first conveyor means for continuously advancing a column of said articles lying flat, a stationary slide plate having a downwardly sloping, substantially planar upper surface for receiving said articles lying flat at its upper end from said first conveyor means, said plate having transversely spaced longitudinal slots therein near the lower end thereof across the path of said articles, second conveyor means for receiving and continuously advancing said column of articles from the lower end of said plate in closely stacked on-edge relation at a slower speed than said first conveyor means, rotatable disc-like cams mounted below said plate having radially projecting lobes spaced around the peripheries thereof and extending through said slots with only small portions of the radially outermost tips of said lobes projecting above the upper surface of the plate as the cams rotate, said articles received at the upper end of said plate being free to slide a substantial distance down the upper surface of the plate into contact with said tips, and means for rotating said cams in a direction and at a speed such that said cam lobe tips projecting above the plate move in the same direction as said articles and at a speed sufficiently in excess of the speed of said articles sliding freely down the surface of the slide plate that each said article including both the leading and trailing edge portions thereof is cammed sharply upwardly away from the surface of the plate by the impact of said tips against the lower surface of the article, whereby the leading edge portion of each article slides beneath and is lifted upwardly into lapped relation and contact with the preceding upwardly cammed article between the latter and said cams.

2. Apparatus as defined in claim 1, wherein the receiving end of the second conveyor means is a short distance below the discharge end of said slide, whereby the articles are deposited on said second conveyor means in stacked on-edge relation.

3. Apparatus as defined in claim 2, comprising means resting on and slidably engaging the top edges of said articles as the same move into position on the second conveyor.

4. Apparatus for conveying and stacking relatively flat articles comprising first conveyor means for continuously advancing a column of said articles lying flat at a constant speed, a downwardly sloping ramp having a planar upper surface for receiving at its upper end said articles lying flat from said first conveyor means, the inclination of the upper surface of said ramp being sufficiently steep that said articles slide freely down the same in column under the force of gravity, said ramp having a longitudinal slot therein in the path of said articles, a rotatable member mounted below said ramp and having cam lobes spaced around the periphery thereof to extend through said slot with only a small portion of the radially outermost tips of said lobes projecting above the upper surface of said ramp as the member rotates, means for rotating said member in a direction and at a speed such that said projecting cam lobe tips move in the same direction as said articles and at a speed sufficiently in excess of the speed of said articles sliding down the ramp that each article is kicked sharply upwardly from the ramp and said member by the impact of said tips against the lower surface of the article as the latter passes over the member to thereby permit the leading edge portion of the next article in the column sliding down the ramp to slide beneath and thus into lapped relation with the next preceding article in the column, and second conveyor means for receiving the column of lapped articles from the lower end of said ramp and for continuously advancing the same at a retarded speed.

5. Apparatus as defined in claim 4 comprising means positioned above said rotatable member to limit the upward movement of the articles kicked upwardly by said member.

6. Apparatus as defined in claim 4, wherein an appreciable portion of the lower end of said ramp is disposed between said rotatable member and the receiving end of said second conveyor means.

7. In apparatus for shingling generally flat articles as the same are advanced as a column of articles, a downwardly sloping platform having an upper substantially planar surface, the inclination of which is sufficiently steep that said articles lying flat thereon will slide freely down the same in column under the force of gravity, said platform having an opening adjacent the lower end thereof in the path of said articles, rotatable means comprising a disc-like member mounted below said platform and having a series of cam lobes on the periphery thereof, said lobes projecting through said opening to only a short distance above the upper surface of the platform, and means to rotate said means at a speed such that the speed of the tips of said lobes appreciably exceeds the speed at which said articles slide down the upper surface of the platform and over said tips, and conveyor means for receiving said articles from the lower end of said platform and for continuously advancing said articles at a lesser speed than that at which the articles slide down the platform.

8. Apparatus as defined in claim 7, wherein said platform has a plurality of transversely spaced openings and said rotatable means comprises a shaft having a plurality of said disc-like members projecting through said openings, each member having a plurality of circumferentially spaced cam lobes.

References Cited

UNITED STATES PATENTS

| 10,929 | 5/1854 | Mitchell | 214—7 X |
| 1,501,285 | 7/1924 | Lawrence | 198—35 X |
| 2,596,228 | 5/1952 | Fletcher | 214—7 X |
| 2,706,053 | 4/1955 | Doller | 214—7 |
| 3,212,621 | 10/1965 | Daugherty | 198—30 |

EDWARD A. SROKA, *Primary Examiner.*